United States Patent [19]

Alinari

[11] 4,327,584
[45] May 4, 1982

[54] DECOMPRESSION GAUGE

[76] Inventor: Carlo Alinari, Corso Vittorio Emanuele 200, Turin, Italy

[21] Appl. No.: 173,245

[22] Filed: Jul. 29, 1980

[51] Int. Cl.³ .......................................... G01F 23/14
[52] U.S. Cl. ................................. 73/300; 73/432 R
[58] Field of Search .................... 73/300, 714, 432 R, 73/432 SD

[56] References Cited

U.S. PATENT DOCUMENTS

| | | | |
|---|---|---|---|
| 3,058,653 | 10/1962 | Des Granges | 235/88 R |
| 3,121,333 | 2/1964 | Alinari | 73/714 |
| 3,578,241 | 5/1971 | Wombough | 235/88 R |
| 3,777,573 | 12/1973 | Alinari | 73/300 |
| 3,831,449 | 8/1974 | MacNiel et al. | 73/300 |
| 3,919,888 | 11/1975 | Muster et al. | 73/300 |
| 3,992,948 | 11/1976 | D'Antonio et al. | 73/432 R |
| 3,992,949 | 11/1976 | Edmondson | 73/432 R |
| 4,056,010 | 11/1977 | Alinari | 73/432 R |

Primary Examiner—Daniel M. Yasich
Attorney, Agent, or Firm—Sughrue, Mion, Zinn, Macpeak and Seas

[57] ABSTRACT

A decompression meter includes a scale having a first section corresponding to conditions in which it is unnecessary for an ascending diver to carry out decompression halts, and a second section corresponding to conditions in which decompression halts are necessary. The second section of the scale is carried by a movable element which can be displaced along the first scale section by means of a manually operable member. Means are provided for indicating the position of the movable element along the first scale section. The position in which the movable element is set is selected by the diver at least on the basis of the maximum depth reached and, optionally, also on the basis of the dwell time at this maximum depth as well as possibly also on the basis of the intervening time between a preceding dive and the current dive.

14 Claims, 14 Drawing Figures

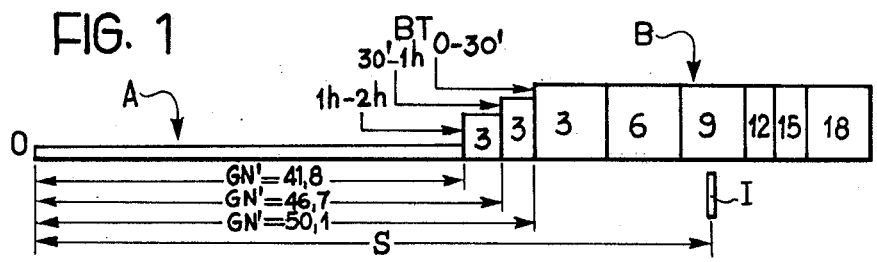
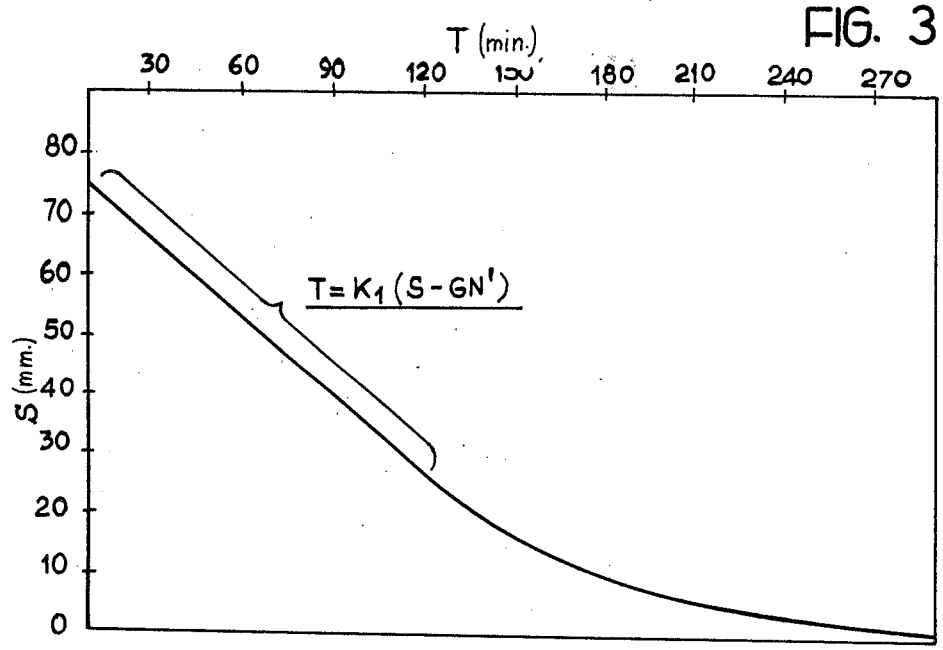
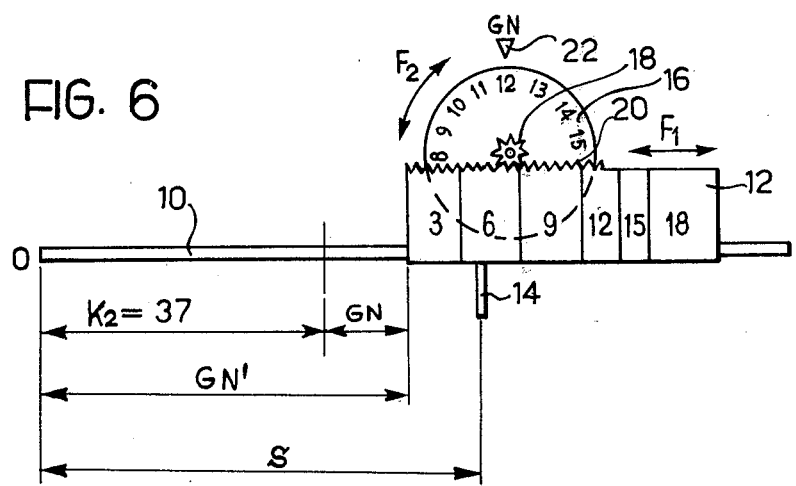

B.T. (min.)

| H (m) | 5 | 10 | 15 | 20 | 25 | 30 | 40 | 50 | 60 | 70 | 80 | 90 | 100 | 110 | 120 | 130 | 140 | 150 | 160 |
|---|---|---|---|---|---|---|---|---|---|---|---|---|---|---|---|---|---|---|---|
| 15 | 0 | 0 | 0 | 0 | 0 | 0 | 0 | 0 | 0 | 9 | 16 | 21 | 26 | 25 | 26 | 26 | 26 | 21 | 17 |
| 18 | 0 | 0 | 0 | 0 | 0 | 0 | 0 | 4 | 31 | 34 | 32 | 31 | 29 | 25 | 20 | | | | |
| 21 | 0 | 0 | 0 | 0 | 0 | 0 | 0 | 11 | 30 | 29 | 30 | 28 | 22 | 13 | | | | | |
| 24 | 0 | 0 | 0 | 0 | 0 | 0 | 6 | 8 | 29 | 30 | 25 | 15 | 8 | | | | | | |
| 27 | 0 | 0 | 0 | 0 | 0 | 0 | 9 | 12 | 30 | 25 | 14 | 4 | | | | | | | |
| 30 | 0 | 0 | 0 | 0 | 0 | 5 | 13 | 14 | 28 | 16 | 5 | 3 | | | | | | | |
| 33 | 0 | 0 | 0 | 0 | 3 | 14 | 15 | 15 | 18 | 8 | 2 | | | | | | | | |
| 36 | 0 | 0 | 0 | 2 | 0 | 14 | 15 | 10 | 13 | 0 | 14 | | | | | | | | |
| 40 | 0 | 0 | 1 | 4 | 6 | 17 | 18 | 5 | 5 | 7 | | | | | | | | | |
| 43 | 0 | 0 | 2 | 1 | 7 | 19 | 16 | 2 | 1 | | | | | | | | | | |
| 46 | 0 | 1 | 3 | 8 | 10 | 21 | 12 | 7 | 7 | | | | | | | | | | |
| 49 | 0 | 1 | 5 | 9 | 11 | 22 | 7 | 10 | | | | | | | | | | | |
| 52 | 0 | 2 | 3 | 13 | 13 | 24 | 4 | 17 | | | | | | | | | | | |
| 55 | 0 | 3 | 8 | 13 | 13 | 24 | 2 | | | | | | | | | | | | |
| 58 | 0 | 4 | 9 | 14 | 16 | 19 | 9 | | | | | | | | | | | | |

FIG. 5

SUBDIVISION ACCORDING TO B.T.
GN=13 | GN=10 | GN=5

B.T. (min.)

| H (m) | 5 | 10 | 15 | 20 | 25 | 30 | 40 | 50 | 60 | 70 | 80 | 90 |
|---|---|---|---|---|---|---|---|---|---|---|---|---|
| 15 | 12 | 12 | 12 | 12 | 12 | 12 | 12 | 12 | 12 | 12 | 12 | 12 |
| 18 | 14 | 14 | 14 | 14 | 14 | 14 | 14 | 14 | 14 | 14 | 14 | 13 |
| 21 | 13 | 13 | 13 | 13 | 13 | 13 | 13 | 13 | 13 | 13 | 13 | 13 |
| 24 | 12 | 12 | 12 | 12 | 12 | 12 | 12 | 12 | 12 | 12 | 12 | 9 |
| 27 | 12 | 12 | 12 | 12 | 12 | 12 | 12 | 12 | 12 | 12 | 9 | 6 |
| 30 | 11 | 11 | 11 | 11 | 11 | 11 | 13 | 13 | 13 | 9 | 6 | 4 |
| 33 | 11 | 11 | 11 | 11 | 11 | 13 | 13 | 13 | 10 | 9 | 9 | 0 |
| 36 | 9 | 9 | 9 | 9 | 13 | 13 | 13 | 12 | 9 | 5 | 0 | — |
| 40 | 5 | 5 | 5 | 11 | 13 | 13 | 14 | 11 | 6 | 3 | — | — |
| 43 | 7 | 7 | 7 | 12 | 13 | 14 | 14 | 9 | 5 | — | — | — |
| 46 | 10 | 10 | 10 | 14 | 14 | 14 | 13 | 7 | 2 | — | — | — |
| 49 | 2 | 2 | 10 | 14 | 15 | 15 | 11 | 7 | — | — | — | — |
| 52 | 6 | 6 | 13 | 15 | 16 | 16 | 11 | 4 | — | — | — | — |
| 55 | 7 | 7 | 14 | 15 | 16 | 16 | 9 | — | — | — | — | — |
| 58 | 8 | 8 | 14 | 16 | 17 | 15 | 7 | — | — | — | — | — |

SUBDIVISION ACCORDING TO H: GN=12, GN=9, GN=5

TABLE OF GN

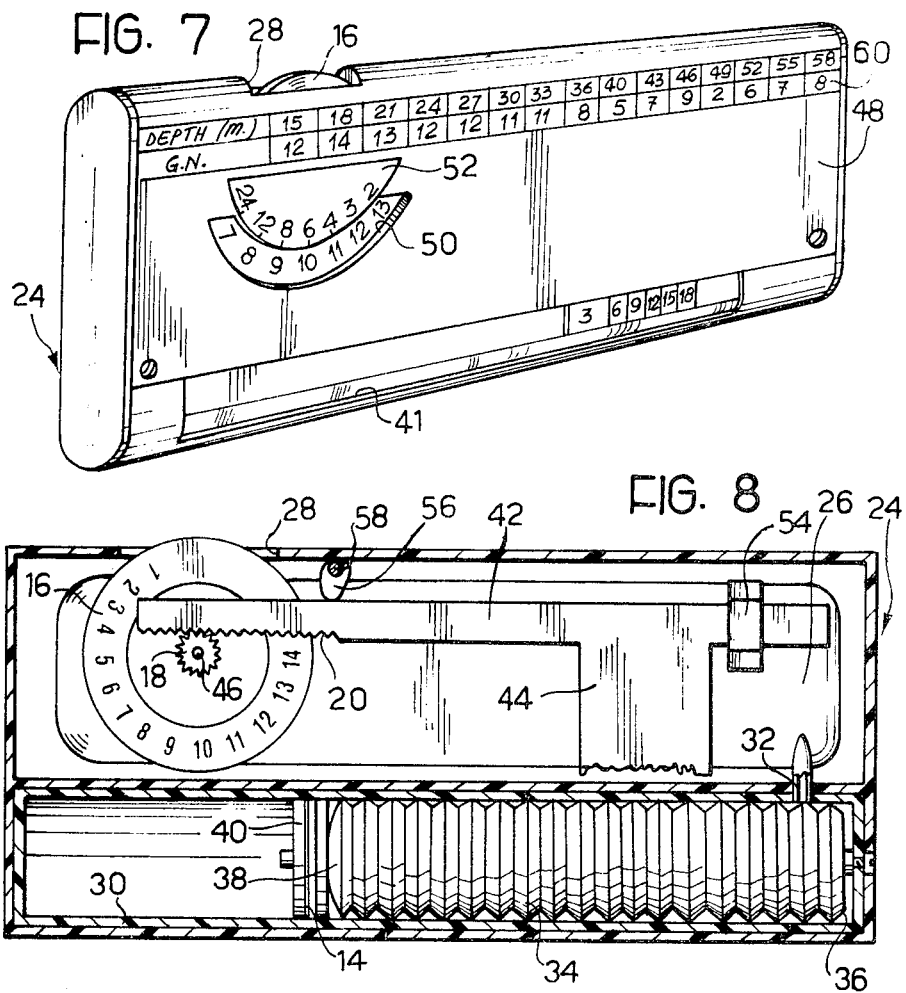
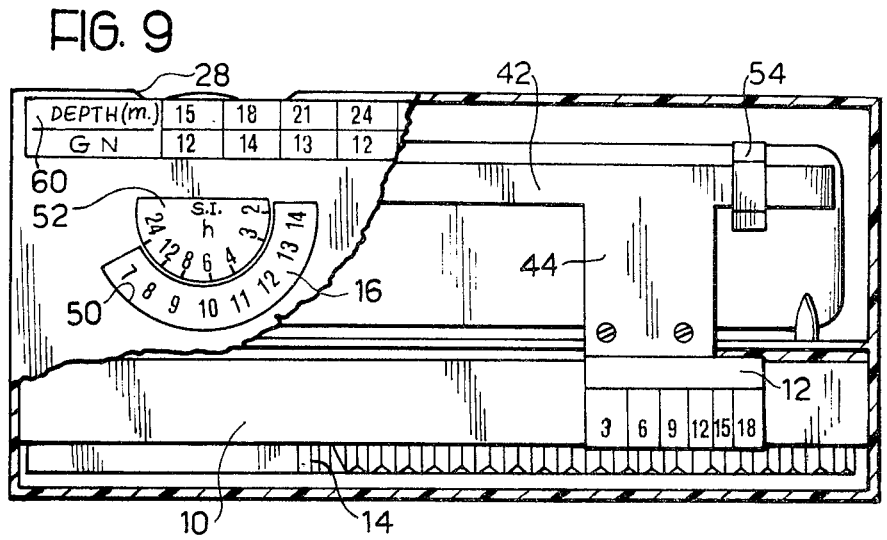

DECOMPRESSION GAUGE

FIELD OF THE INVENTION

The present invention relates to decompression gauges or meters arranged to indicate the duration and depth of decompression halts to be effected by an underwater diver during ascent to the surface.

In particular, the invention relates to a decompression meter of the type comprising:

- a housing formed with at least one aperture communicating the interior of the housing with the external water environment;
- a deformable envelope defining a variable volume chamber, a rigid envelope defining a fixed volume chamber, and means defining a restricted passage intercommunicating said chambers, both said chambers being disposed within the housing and containing gas, and the deformable envelope being subjected to the pressure of the external environment;
- a pressure transducer disposed in said fixed volume chamber and arranged to sense the pressure of gas therein;
- a scale comprising a first section corresponding to conditions in which decompression halts during the ascent of a diver towards the water surface are unnecessary, and a second section corresponding to conditions in which decompression halts are necessary during the ascent; and
- an index operatively associated with the transducer and movable along the scale in dependence on the pressure sensed by the transducer, said index being arranged to perform a return movement in a direction from the second to the first section during ascent from a dive.

BACKGROUND OF THE INVENTION

It is known that divers using air breathing equipment run the risk of nitrogen embolism when ascending to the surface after a dive. To avoid this risk a diver should effect his ascent in stages with one or more decompression halts at specific depths. The depths at which these decompression halts should be made and the necessary dwell times at these depths are set out in decompression tables as a function of the maximum depth reached during the dive and the length of time at this maximum depth. The use of decompression tables is rather inconvenient and complicated when the dive is performed at a variable depth and when repeated dives are performed separated in time.

Due to these difficulties, devices called decompression meters have become widely used, these devices being designed to automatically present to the diver the data necessary for him to effect an ascent without incurring the risk of embolism.

There exist various forms of decompression meter all of which have a structure substantially as set out at the beginning of the present specification. These decompression meters can be classified into two main groups; namely those with a linear scale and those with a circular scale.

In the following introductory discussion of decompression meters those having a linear-scale will be primarily considered, it being understood that the discussion is valid, mutatis mutandis, for meters with a circular scale.

The introductory discussion will be made with reference to FIGS. 1 to 5 of the accompanying drawings, in which:

FIG. 1 is a diagrammatic representation of the linear scale and movable index of a standard decompression meter;

Figure 2:
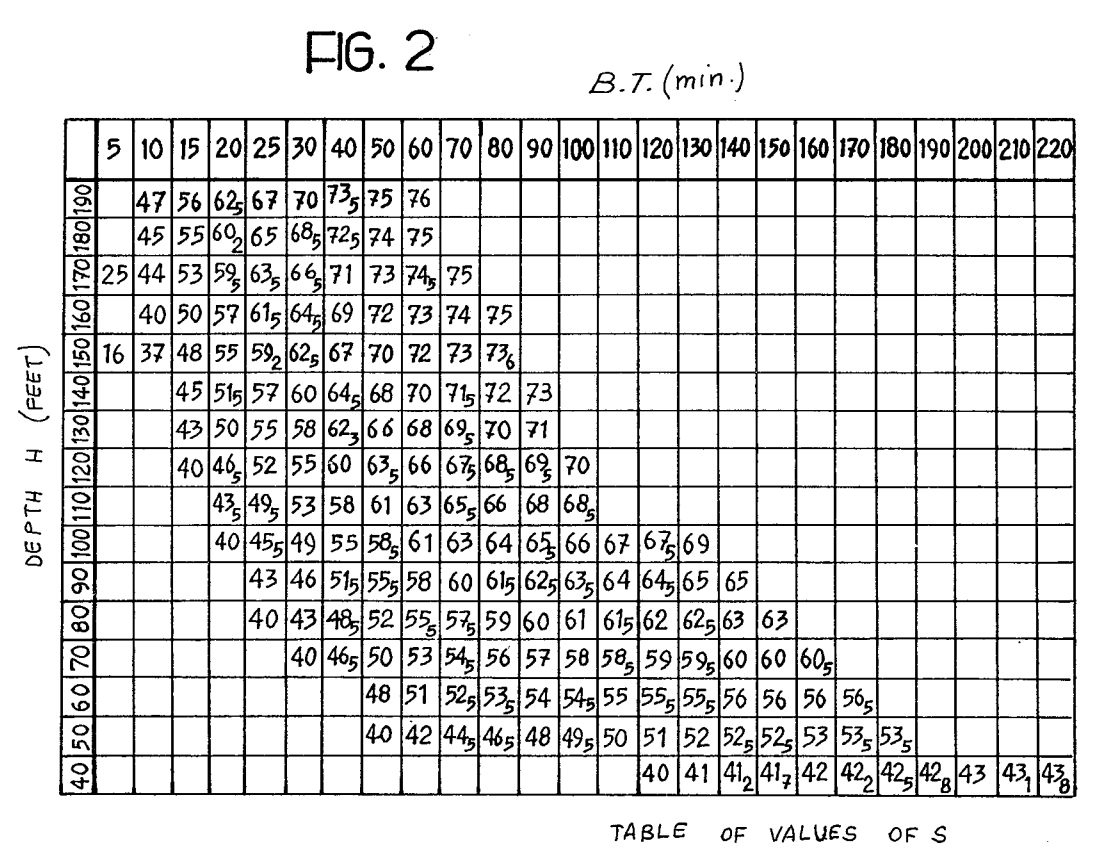

FIG. 2 is an experimentally-determined table for a known type of decompression meter of the FIG. 1 form, the table giving values for the displacement of the movable index of the meter as a function of the maximum depth reached during a dive and of the dwell time at this depth;

FIG. 3 is an experimentally-determined decompression diagram for the same decompression meter as used in the preparation of FIG. 2, the diagram indicating the relationship between the displacement of the index and the return times of the index towards the scale origin in a simulated ascent test, FIG. 4 is a table, obtained by calculation, of the errors in decompression time presented by the decompression meter used in the preparation of FIGS. 2 and 3, the errors being tabulated as a function of the maximum depth of dive and of the dwell time at that depth; and FIG. 5 is a table of guide numbers for the correction of the errors in decompression time presented by the meter as a function of the maximum depth reached and of the dwell time at this depth.

As shown in FIG. 1, the linear scale of a standard decompression meter is subdivided into two successive sections, respectively indicated by A and B.

The first section A extends from the origin of the scale and consists of a strip which, conventionally, is coloured blue. The second section B, which follows on immediately from the first, is constituted by a strip of greater height than that used for the scale section A. The strip used for section B is conventionally coloured red and is subdivided into successive zones, each of which indicates the depth at which a decompression halt should be made during ascent from a dive. In FIG. 1, these depths are indicated in meters (3-3-3-6-9-12-15-18).

An index I is movable along the scale, the displacement of the index from the scale origin being represented by S.

During a dive, the index I is caused to move from the scale origin towards the right. If, at the beginning of the ascent from the dive, the index I has not reached the scale section B this means that the diver does not have to effect any decompression halts during the ascent.

If, on the other hand, the index I is in the scale section B at the beginning of the ascent, this means that the diver must effect one or more decompression halts. During the ascent, the index returns back slowly across the scale from the right to the left as viewed in FIG. 1. The diver must remain at the depth indicated by the index I on the scale section B until the index has moved back to a shallower depth whereupon the diver can ascend to this latter depth. Thus, in the the situation illustrated in FIG. 1, in which the index I is located in correspondence to the zone marked 9, the diver must remain at the depth of nine meters for the whole of the time taken by the index to reach the left hand end of the zone "9". Thereafter, the diver will have to halt at 6 meters for the whole of the time taken by the index I to traverse the zone marked "6" from right to left and so on.

To adapt the actual operation of the decompression meter to the data provided by the decompression tables most in use, the scale carries various corrections. The correction actually used is based on the duration of the dive at the maximum depth. This duration is usually called "Bottom Time" or "B.T.". For this purpose the zone representing the decompression halt at 3 meters is divided into three parts each with a corresponding range of B.T. These three parts of zone "3" are given a stepped outline to facilitate their identification by the diver.

As indicated in FIG. 1, if the B.T. has been from 0 to 30 minutes, the diver when ascending need only halt at 3 meters for the time taken by the index I to traverse the first, right hand, part of zone "3" from right to left. For a B.T. lying between 30 minutes and 1 hour, the diver must remain at 3 meters until the index I has reached the left hand end of the middle part of zone "3". Finally, for a B.T. from 1 h. to 2 h., the diver must remain at 3 meters for the whole of the time taken for the index I to completely traverse the three parts of zone "3".

Notwithstanding the foregoing expedient for correcting the decompression time indicated by the meter, substantial errors are still present in the indicated decompression times as compared with the times set out in the standard decompression tables.

Summarised below are the results of a study carried out on the deficiencies of the standard form of decompression meter scale, the object of this study being to devise a different form of scale less subject to error and generally safer. For this purpose a large amount of data was collected on the operation of standard decompression meters; this data was then studied by a graphic method as this permits the behaviour of a linear scale decompression meter to be analysed with considerable precision.

The study was carried out on a standard linear scale decompression meter of a widely used and well known type, commercially available under the designation "DCS" and produced by SOS s.a.s. of Turin (Italy).

The "DCS" decompression meter was subjected to a constant pressure for different exposure times (corresponding to different "B.T.s") and for each of these times the corresponding value of the displacement S (in millimeters) of the index I was recorded. The test was repeated for different values of constant pressure to obtain a so-called pressure diagram (not illustrated), from which the Table shown in FIG. 2 was derived, for greater ease of use. In this Table, the pressure values have been replaced by the corresponding depth of water H in feet (1 foot equals 0.3048 meters), and the values of the displacement S (in millimeters) have been recorded as a function of the depth H and of the B.T. (in minutes).

The purpose of the Table of FIG. 2 will become clear hereinafter.

A decompression diagram (FIG. 3) was also obtained for the "DCS" decompression meter. This diagram shows the relationship between the displacements of the index I from the scale origin (in millimeters) and the time T (in minutes) during decompression. The diagram of FIG. 3 was obtained very simply by saturating the decompression meter, (that is, by causing the index I to be displaced to the end of the scale) and then allowing the index to return (towards the left in FIG. 1) against a controlled opposing pressure which is successively reduced in correspondence to the decompression halts made at various depths of water. Examination of the diagram of FIG. 3 reveals that in the region in which the decompression halts (left part of the diagram), are found, the curve is not exponential, but practically a straight line the equation of which is as follows:

$$T = K_1(S - GN') \quad (1)$$

where:
GN' is the instantaneous value of the displacement of the index I from the scale origin;
S is the value of the displacement of the index I at the start of decompression after a dive to depth H for a duration B.T.;
T is the time in minutes taken by the index I to traverse the section of the scale lying between S' and GN', and
$K_1$ is an instrument constant.

Although the tests were performed with a particular kind of instrument, those skilled in the art can easily verify that equation (1) is valid for all types of decompression meters (both linear scale and circular scale types) having the general structure as mentioned at the beginning. All that varies from one type of decompression meter to another is the value of $K_1$. Moreover, in a circular scale decompression meter the values of S and GN' can be expressed in length of arc or in degrees. In the particular type of "DCS" meter tested, and with S and GN' expressed in millimeters, one has:

$$K_1 = 3.4 \text{ (min/mm)}$$

In FIG. 1 there are indicated in millimeters the values of GN' corresponding to the three different B.T.s discussed above for the said "DCS" instrument.

Now supposing a dive to 90 feet (27.4 meters) and of a B.T. duration = 70 minutes is simulated with the "DCS" meter under consideration. The U.S. Navy decompression tables—revised edition of 1958—neglecting the descent and ascent times between one decompression height and another, provide the following data:

halt at 3 meters: 30 minutes; halt at 6 meters: 7 minutes; total decompression time $T_{tab} = 37$ minutes.

From the Table of the values of S for the "DCS" meter (FIG. 2) one finds that S = 60 mm.

Now, for B.T. = 70 minutes it is recommended that the first scale step be used to determine the length of the decompression halt at 3 meters, the corresponding value of GN' being 41.8 millimeters. The total decompression time $T_{dec}$ as determined by the decompression meter will thus be:

$$T_{dec} = 3.4(S - GN') = 3.4(60 - 41.8) = 61.8 \text{ min.}$$

Therefore, there will be an error, with respect to the U.S. Navy tables, equal to:

$$T_{dec} - T_{tab} = 61.8 - 37 = +24.8 \text{ min.}$$

It will be appreciated that this error can be considered as originating from the incorrect choice of the value of GN' for the particular decompression starting conditions concerned.

By performing the above calculation for all the values provided by the U.S. Navy tables it is possible to compile a table of the errors in the decompression meter. Such a table is shown in FIG. 4 and in this table the vertical lines mark the boundary between the area where no decompression halts are required (the marking of these lines being in accordance with the U.S.

Navy tables). The framed numbers represent the time in minutes by which the meter provides an under-estimate of the decompression time indicated as necessary by the U.S. Navy tables, whilst the non framed numbers represent the overestimate of the necessary decompression time by the meter.

From an examination of the table of FIG. 4 it is apparent that the decompression meter is safe in depths up to 30 meters; at depths less than 30 meters it indicates the necessity for decompression too soon and provides exaggerated values for the necessary decompression time. Although this erroneous indication by the meter is safe, it results in the diver going through unnessary or over-long decompressions, with a large wastage of air, in the range of depths most frequently used.

At depths greater than 30 meters the decompression meter will be late in indicating the need for decompression halts and, when finally it does indicate the need for such halts, the decompression times indicated are too high. The delay in indicating the need for decompression halts is on average from 5 to 10 minutes which represents a real risk for the diver who might as a consequence suffer from the phenomenon of embolism.

By re-arranging equation (1), the following relationship is derived:

$$GN' = S - (T/3.4)$$

From this relation and using the data provided from the U.S. Navy tables, it is possible to derive the value of $GN'$ required for each set of decompression starting conditions in order to have a decompression meter with nil error.

It will be appreciated that the three values of $GN'$ provided on the FIG. 1 meter and appropriate for different decompression starting conditions, are an attempt to provide a variation in the value of $GN'$ in order to minimise the meter error. As will be shown hereinafter, the stated desiderata for choosing a particular one of the three available values of $GN'$ are far from ideal.

At this stage it is convenient to introduce a number $GN$ (to be known as the "guide number") which is related to $GN'$ by the following relationship:

$$GN = GN' - K_2$$

In the case of the "DCS" linear scale decompression meter investigated, it is seen that the $GN'$ corresponding to a B.T. lying between 1 h and 2 h is 41.8 millimeters. It is a matter of an arbitary value, but the order of magnitude of which is convenient for the particular type of instrument considered.

For this type of meter a value of $K_2 = 37$ will be chosen. In practice this can be treated as equivalent to a displacement of the scale origin of 37 millimeters towards the right as viewed in FIG. 1 with the new value of $GN'$ then being called GN. The reasons for choosing $K_2 = 37$ will become clear below. For the moment it is sufficient to note that a displacement of the origin of the scale towards the right, but within the first scale section A (the "blue" zone) does not introduce any complications, since when the index I has passed the second scale section B (the "red zone") on its return towards the left, it is no longer necessary to perform decompression halts.

An examplary calculation of the guide number GN will now be made: putting H = 60 feet = 18.3 meters and B.T. = 100', from the U.S. Navy tables a total decompression time $T_{tab} = 14'$ is obtained. From the FIG. 2 table, the value of S' for the meter is given as 54.5 millimeters.

By substituting these values into the preceding relationships it is possible to calculate the value of $GN'$ which would give the correct decompression time:

$$GN' = S - (T_{tab}/3.4) = 54.5 - (14/3.4) = 50.38 \text{ mm}.$$

The corresponding value of GN is then:

$$GN = 50.38 - 37 = 13.38 \simeq 13.$$

By carrying out similar calculations for all the values given in the U.S. Navy tables, a table of guide numbers GN can be built up (see FIG. 5) giving, for different decompression starting conditions, the guide number corresponding to the correct indication of decompression time by the meter.

In the FIG. 5 table, the vertical thick lines furthest to the left marks the boundary of the area of the table corresponding to the need for decompression halts as indicated by the U.S. Navy tables; the single stepped line indicates the operational bounds for a diver provided with cylinder breathing apparatus of 4000 liters; the double stepped line indicates the operational bounds for a diver provided with a double-cylinder breathing apparatus having a capacity of 8000 liters.

The adjustment to the value of $GN'$ (and thus GN) used with the fixed scales of known decompression meters, such as the linear decompression meter previously considered, is effected on the basis only of the "Bottom Time" (B.T.). Thus, for a scale such as that of FIG. 1, one has:

for B.T. lying between 0 and 30': $GN' = 50.1$, from which $GN = 13$;

for B.T. lying between 30' and 1 h: $GN' = 46.7$, from which $GN = 10$;

for B.T. lying between 1 h and 2 h: $GN' = 41.8$, from which $GN = 5$.

These values of GN have been marked in on the table of FIG. 5 over the corresponding ranges of the B.T. scale.

As can be seen from the table, the values of GN used by the meter bear little relationship to the values required to give the correct decompression times. Indeed, it could be said that the chosen values of GN have the opposite effect from what is required. Thus for example, where a standard decompression meter uses a value of $GN = 5$, the table indicates that the optimum GN for the same B.T. range is of the order of 12. In the other two B.T. ranges, the correspondence between the GN of the standard decompression meter and the optimum GN is also poor.

If, instead, the FIG. 5 table is subdivided into three depth bands in the manner indicated on the right of the figure, it is seen that a mean GN equal to 12 is appropriate for the depth band which goes from 15 to 27 meters; a mean GN equal to 9 is appropriate to the depth band H which goes from 30 to 36 meters, and a mean GN equal to 5 is appropriate to the depth band H of 40 meters and more. With this subdivision on the basis of the depth H rather than on the basis of the B.T., the errors in decompression time as determined by the meter are practically nil down to a depth of 30 meters. From 30 meters to 60 meters the start of the need for decompression is correctly indicated and any errors in decompression time are on the safe side.

The subdivision of the FIG. 5 table into bands according to maximum depth reached is therefore much more in keeping with what is required than a subdivision on the basis of dwell times at the maximum depth. The only disadvantage of employing the described subdivision according to depth, with for a standard fixed-scale decompression meter, is that for the lower depth ranges, adequate account is not taken of the deeper decompression halts; as a result in the horizontal depth band in which the mean GN is equal to 5, there appear in the table values of GN equal to 15.

OBJECT OF THE INVENTION

The object of the present invention is to provide a decompression meter which, on the other hand, avoids the risk of gaseous embolism resulting from false readings given by the meter, and on the other hand permits the maximum exploitation of the air capacity of the diver's breathing apparatus particularly as regards dwell time at the greater depths.

SUMMARY OF THE INVENTION

According to the present invention this object is achieved by means of a decompression meter of the type initially mentioned, wherein:

the second section of the scale is carried by a movable element so mounted by the housing as to be displaceable relative to the first scale section, the position of the movable element relative to said first scale section being indicated by indicator means of the meter, and said element having an associated manual operating member operable by the diver to cause displacement of the element along said first scale section to a position selected at least on the basis of the maximum depth reached and, optionally, on the basis of the dwell time at this maximum depth and on the basis of the elapsed time between the previous dive and the current dive.

The advantages of a decompression meter of this form will become clear from the description of the invention given hereinafter with reference to FIG. 6 of the accompanying drawings; these advantages will also be apparent from the subsequent description of two practical forms of meter embodying the invention.

BRIEF DESCRIPTION OF THE DRAWINGS

In the drawings:

FIG. 1 is a diagrammatic representation of the linear scale and movable index of a standard decompression meter;

FIG. 2 is an experimentally-determined table for a known type of decompression meter of the FIG. 1 form, the table giving values for the displacement of movable index of the meter as a function of the maximum depth reached during a dive and of the dwell time at this depth;

FIG. 3 is an experimentally-determined decompression diagram for the same decompression meter as used in the preparation of FIG. 2, the diagram indicating the relationship between the displacement of the index and the return times of the index towards the scale origin in a simulated ascent test;

FIG. 4 is a table, obtained by calculation, of the errors in decompression time presented by the decompression meter used in the preparation of FIGS. 2 and 3, the errors being tabulated as a function of the maximum depth of dive and of the dwell time at that depth; and FIG. 5 is a table of guide numbers for the correction of the errors in decompression time presented by the meter as a function of the maximum depth reached and of the dwell time at this depth.

FIG. 6 is a diagrammatic representation of a linear scale of a decompression meter embodying the invention, there being also shown means for moving a movable section of the scale.

FIG. 7 is a perspective view of a first practical form of decompression meter embodying the invention, this meter being provided with a linear scale;

FIG. 8 is a longitudinal section, to an enlarged scale, of the meter shown in FIG. 7, the section being taken in a plane corresponding to the line VIII—VIII of FIG. 6;

FIG. 9 is a plan view of the decompression meter with the front wall of the meter housing partially removed to reveal internal details of the meter;

DESCRIPTION OF THE INVENTION

Figure 10:
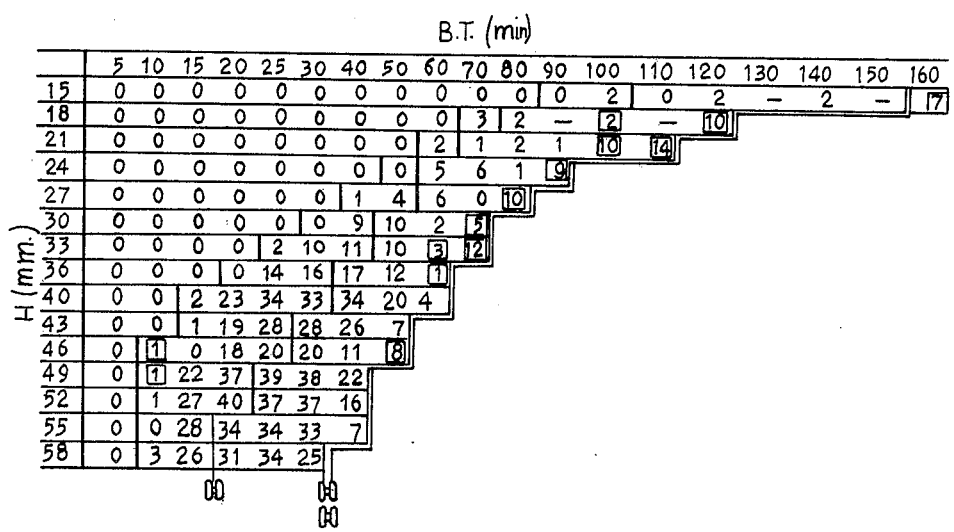
FIGS. 10 and 11 are tables similar to those of FIG. 4, and show the errors in decompression time presented by the decompression meter of FIGS. 7 to 9 when operated in accordance with respective simplified procedures.

The linear scale diagrammatically represented in FIG. 6 comprises a first section 10 and a second section 12.

The first section 10 is formed by a strip which can be coloured blue in the conventional manner. The second section 12 is constituted by an element movable along the strip 10, as indicated by the arrow $F_1$. In the present case the element 12 is a small plate, however, where the scale is a circular one the element 12 would be in the form of the segment of a circle. The element 12 can be coloured red in the conventional manner.

Like the scale section B shown in FIG. 1, the element 12 is subdivided into zones which represent the decompression halts to be performed at different depths by an ascending diver (3,6,9,12,15,18). However, in contrast to the scale of FIG. 1, the zone corresponding to the halt at the depth of 3 meters is not further divided up into several parts.

An index 14 (corresponding to the index I of FIG. 1) is movable along the scale 10, 12, its displacement from the scale origin being represented by the variable S.

In FIG. 6 it is assumed that under the same external conditions, the displacement (in millimeters) of the index 14 is the same as for the index I of FIG. 1; as a consequence, the relation between GN and GN' previously given still holds; viz:

$$GN = GN' - 37 \text{ (mm)}$$

The advantage offered by the arrangement of FIG. 6 is that the guide number GN can be adjusted over a wide range by the backwards and forwards displacement of the element 12 as indicated by the arrow $F_1$. From the earlier discussion of the standard decompression meter represented in FIG. 1, it will be appreciated that the ability to adjust the value of GN over a wide range enables the errors in decompression time to be substantially eliminated provided the appropriate value of GN is set for the decompression starting conditions present.

Of course, the diver must be able to read the guide number GN currently set. In a very simple embodiment of the present invention, the element 12 could directly carry the guide number shown in the FIG. 5 table, in such a way that these numbers are moved past a fixed index which serves to indicate the value of GN currently set. However, an arrangement such as that illustrated in FIG. 6 is more suitable. In this arrangement the guide numbers are carried by an indicator plate in the form of a manually turnable disc 16 to which is rigidly connected a toothed sprocket 18. This sprocket 18 cooperates with a toothed portion or rack 20 of the plate 12.

The disc 16 is movable by hand and cooperates with a fixed index 22, marked "GN" on the decompression meter.

The reduction gearing constituted by the sprocket 18 and rack 20 not only permits a micrometric adjustment of the position of the element 12 along the scale, but also enables a greater spacing of the various guide numbers around the periphery of the disc 16, which facilitates reading of these numbers.

Obviously, due to the arbitrary nature of the formula used to define the guide numbers, their actual values are of no particular significance so that the numbers on the disc 16 can be substituted for by guide symbols, even pictorial ones, of any nature whatsoever.

In practice, the use of numbers lying between 1 and 20 is advisable, since the diver should not be able to confuse the guide numbers with indications of his depth, this being particularly so at great depths. This possibility of confusion is especially real if one considers the adverse, not to say unnatural, environment in which the diver finds himself at great depths.

There will now be described several ways of using a decompression meter embodying the invention.

If the diver had a precise knowledge of the dive time B.T. and of the maximum depth reached, it is clear that by consulting the GN table (FIG. 5) and adjusting the position of the element 12 in conformity therewith he would set the decompression meter into a state in which virtually no decompression time error would arise, (this being true regardless of the diving conditions present).

Unfortunately, only the dive time can be accurately measured, the evaluation of the effective depth of dive being very much more difficult and subjective. Of course, in cases of doubt as to the value of GN to be used, the rule must always be that of the possible alternative values of GN, the value selected should be the lowest one; in this way any error in decompression time will always be on the safe side (that is, a larger than necessary decompression time).

In the practical case under consideration, each unit of GN corresponds to 3.4 minutes of decompression time. From a statistical treatment of the FIG. 5 GN table extended to cover the whole range of use of the decompression meter with a reserve of air of 8000 liters, it can be shown that if the diver estimates his effective dive depth to within 5 meters, an error of +5 minutes will be present in the decompression time as determined by the meter; with the depth estimate made to within 10 meters, the average resulting error will be +10 minutes.

Greater safety and precision is not the only advantage offered by the provision of the movable scale element: it is evident that by reducing the GN selected by one or two units it will be possible to take into account the effect of fatigue. For this purpose it will be convenient to utilise the following rule in selecting the GN actually set:

| normal dive | : | GN (as determined by dive depth and time) |
|---|---|---|
| average work | : | GN-1 |
| heavy work | : | GN-2 |

The GN can also be reduced on the basis of the temperature of the water, as follows:

normal temperature: GN low temperature (for example less than 10° C.): GN−1.

Another advantage of decompression meters embodying the invention is that, if properly utilised, they perform well even at the lower diving depths which require deep decompression halts to be made when ascending therefrom (as can be seen from the table of errors shown in FIGS. 10 and 11, about which more will be said below). Indeed, from FIGS. 10 and 11 it can be verified that for deep dives the values of GN are practically co-incident with those of the U.S. Navy tables up to an air consumption of 6000 liters.

DESCRIPTION OF THE FIRST PRACTICAL EMBODIMENT

The first practical embodiment (a linear scale decompression meter) will now be described with reference to FIGS. 7 to 9.

In these figures, the parts corresponding to those of FIG. 6 have been indicated with the same reference numerals.

The decompression meter comprises a housing 24 which is preferably made of plastics material and has a flattened and elongate form.

A deformable envelope 26 is disposed within the housing 24 and defines an internal chamber having a variable volume. The housing 24 is provided with at least one aperture through which water can penetrate into its interior. One such aperture is, for example, a slot 28 which, as will be described below, also serves another purpose.

The housing 24 also contains a rigid casing or envelope 30 which is fixed in position and extends along one longitudinal edge of the body 24. The rigid envelope 30 is made of a transparent plastics material and has a tubular form.

The internal chambers defined by the deformable and rigid envelopes 26 and 30 contain a gas (normally air) and are interconnected by a throttled or restricted passage 32.

A pressure transducer in the form of an elongate element 34 is located within the envelope 30. The element 34 is constituted by a sealed capsule made from a plastics film material and comprises a lateral bellows wall which extends between two substantially-rigid, opposite end walls 36 and 38.

The element 34 contains a gas which at surface level is at substantially atmospheric pressure, and possibly a certain quantity of liquid (oil or mercury) for calibration purposes.

Due to its bellows-like construction, the element 34 can contract and expand along its longitudinal direction which is coincident with the longitudinal direction of the rigid tubular envelope 30.

The end wall 36 of the element 34 is fixed to a corresponding end wall of the rigid envelope 30, whilst the end wall 38 carries a disc 40. The disc 40 is provided with a peripheral groove which constitutes the index 14 of the meter.

Over the whole length of the rigid tubular envelope 30 there extends a fixed strip 10 which corresponds to the fixed scale strip 10 of FIG. 6. The width of the strip 10 is such as to leave a portion of the transparent tubular envelope 30 exposed all along its length so as to enable the position of the index 14 to be seen. Both the strip 10 and the uncovered portion of the envelope 30 (and thus the index 14), are visible through an elongate marginal window 41 of the housing 24.

The second or movable section of the scale is on a movable element in the form of a small plate 12 (similar to that of FIG. 6) positioned above the strip 10. The small plate 12 is carried by a lateral projection 44 of an elongate toothed member 42 which is movably mounted within the housing 24 and which extends parallel to the rigid tubular envelope 30. The toothed member 42, its lateral projection 44 and the small plate 12 are advantageously made of plastics material.

The edge of the member 42 lying on the same side as the small plate 12 has a toothed portion 20 equivalent to that of FIG. 6. The toothed portion 20 meshes with a toothed sprocket 18 similar to that of FIG. 6. The sprocket 18 is rotatably mounted on a pivot pin 46 fixed to the housing 24. The sprocket 18 is rigidly connected to a quadrant or disc 16 similar to that of FIG. 5. The disc 16 which constitutes an indicator plate is marked with a series of guide numbers or symbols.

A portion of the periphery of the disc 16 is accessible from externally of the housing 24 through the slot 28. By using a finger the diver can thus rotate the disc 16 to cause the small plate 12 to be linearly displaced along the scale 10 of the decompression meter. The disc 16 thus serves both as an operating member for moving the plate 12 as well as an indicator plate carrying the guide numbers or symbols.

The front face 48 of the housing 24 is formed with an arcuate slot 50 through which can be seen part of the series of guide numbers marked on the disc 16. Associated with the slot 50 is a semi-circular small plate 52 which is fixed to the front wall 48. This plate 52 carries a series of numbers and reference marks; each such mark can be considered as corresponding to the fixed index 22 of FIG. 6.

The reference marks provided on the plate 52 enable the guide number set to be adjusted according to the elapsed time between one dive and the next. The numbers marked on the small plate 52 represent the hours intervening between one dive and another. The criterion for using the markings of the small plate 52 will be explained below.

The general operation of the decompression meter, apart from the adjustment of the movable scale element 12 is well known, being that of the "DCS" meter previously mentioned; however, a brief description of the operation of the meter will now be given.

During a dive, the pressure of the water which enters the housing 24 compresses the deformable envelope 26, reducing the volume of its internal chamber and progressively forcing gas out of this chamber, through the throttled passage 32, and into the chamber defined by the rigid envelope 30. As the depth of dive increases, an increasing quantity of gas is transferred into the chamber of the rigid envelope 30 to cause a correspondingly increasing compression of the transducer element 34; as a result, the index 14 is progressively displaced towards the right (as viewed in FIGS. 8 and 9). Due to the resistance offered by the throttled passage 32 to the transfer of gas between the chambers, the displacement of the index 14 depends not only on the depth reached, but also on the duration of the dive.

During ascent from the dive, the opposite happens. As the pressure on the envelope 26 reduces, gas gradually returns from the chamber defined by the rigid envelope 30 to the chamber of the flexible envelope 28 through the throttled passage 32. The throttling of the gas flow by the passage 32 slows this return transfer of gas so that the transducer element 34 expands only slowly; as a result the index 14 is only slowly returned leftwards towards its initial position. The foregoing description of the operation of the meter accords with the known operating principles of existing decompression meters. The response characteristics of the meter (which are closely dependent on the characteristics of the throttled passage 32 and the transducer element 34) result in the known defects that have been criticised in the introductory part of the present specification, that is, either the decompression halts indicated as necessary by the meter are too long which leads to an unnecessarily large consumption of air by the diver, or else the indicated halts are too short, which gives rise to the risk of embolism.

The capability of micrometric adjustment of the position of the plate 12 which is possessed by the meter of FIGS. 7 to 9, means that the length GN' can be adjusted to provide a fairly precise correction of errors; in practice adjustment of the value of GN' is carried out by changing the selected guide number GN.

In order for the micrometric adjustment to be effected accurately it is essential to eliminate, or reduce as much as possible, play between the toothed portion 20 and the sprocket 18. It is also desirable that the meter should be both robust and economical, without detriment to the precision of the micrometric adjustment. A simple arrangement for eliminating or significantly reducing play between the toothed portion and the sprocket 18 is illustrated in FIGS. 7 and 8. In this arrangement the end portion of the toothed member 42 which is remote from the sprocket 18 is slidably mounted, with lateral play, in a bracket 54 which takes the form of a U-bolt fixed to the housing 24. An eccentric 56 positioned intermediate the sprocket 18 and the bracket 54 (and, preferably, adjacent the sprocket 18) engages the edge of the member 52 opposite the toothed portion 20 and serves to keep the toothed portion 20 firmly in engagement with the sprocket 18, without appreciable play. The eccentric 56 is fixed in an adjustable manner to the housing 24 by means of a screw 58.

The purpose of the markings carried by the plate 52 will now be explained.

As is known, decompression meters have by their nature little "memory"; in other words, the meter index (for example, index 14) returns to zero shortly after the emergence of the diver from the water. If the diver goes onto perform another dive after only a short time, not all the nitrogen dissolved in his blood will have been eliminated, so that the risk of gaseous embolism in the subsequent dive is greater.

In these circumstances, it is therefore advisable to set a smaller value of guide number GN than required by the FIG. 5 table in order to reduce the distance GN' between the scale origin and the nearest edge of the small plate 12; the reduction in the value of GN should be made greater the smaller is the interval which separates a subsequent dive from the preceding one. This interval is normally called S.I. ("surface interval").

The corrections to be made to the GN in the case of repeated dives are given in the following table:

| S.I. (hours) | 2 | 3 | 4 | 5 | 6 | 7 | 8 | 9 | 10 | 11 | 12 |
|---|---|---|---|---|---|---|---|---|---|---|---|
| GN Correction | −7 | −6 | −4 | −4 | −4 | −3 | −3 | −3 | −2 | −1 | −1 |

This table of corrections has been derived from diagrams obtained from data on repeated dives. The lowest value of S.I. shown is two hours, since for intervals of smaller duration the correction would be very critical. The maximum S.I. given is 24 hours since after this time the human body no longer feels the effects of a previous dive.

The markings carried by the plate 52 correspond to those of the preceding table of correction. In practice, the reference mark corresponding to an S.I. of 24 hours is equivalent to the single fixed index 22 of FIG. 6.

The provision of the plate 52 avoids the need to refer to a separate correction table. For example, if the guide member indicated on the table of FIG. 5 is "10", and if the S.I. interval is 6 hours, all that the diver has to do is to turn the disc 16 until the number "10" is aligned with the number "6" of the fixed plate 52.

Various types of tables of guide numbers can be used with decompression meters embodying the invention and three possible types of table are discussed below:

(A) For onerous dives and those requiring 8000 liters of air it will be necessary to use the general GN table illustrated in FIG. 5, which can be printed either on a plate of plastics material to be carried around the divers neck, or else on a small rotating drum calculator of known type. As is usual, the diver will also have to be equipped with a watch and with a depth gauge which is preferably of the type indicating maximum depth attained.

(B) For normal dives, that is to say those executed with breathing apparatus of the type having cylinders of 4000 liters capacity, a small linear table attached to the decompression meter itself will normally be sufficient. Such a table is provided on the meter shown in FIGS. 7 to 9 and is referenced 60 (see FIG. 7 and also FIG. 9). The same small table is, for convenience, set out below:

| B.T. Max Depth. | 80' | 70' | 60' | 55' | 50' | 45' | 40' | 30' | 25' | 20' | 20' | 15' | 15' | 10' | 10' |
|---|---|---|---|---|---|---|---|---|---|---|---|---|---|---|---|
| Meters | 15 | 18 | 21 | 24 | 27 | 30 | 33 | 36 | 40 | 43 | 46 | 49 | 52 | 55 | 58 |
| GN | 12 | 14 | 13 | 12 | 12 | 11 | 11 | 9 | 5 | 7 | 10 | 5 | 6 | 7 | 8 |

By using this table, the decompression time errors indicated in the table of FIG. 10 will be incurred.

From the FIG. 10 table (in which the same designations have been utilised as in FIGS. 4 and 5) it can be seen that the vast majority of errors are errors of excess which result only in a greater consumption of air than strictly necessary, whilst the number of errors corresponding to an under estimate of decompression time (framed numbers) are few, are small in magnitude, and correspond for the most part to dive times (B.T.) outside the operational range of breathing apparatus of the single cylinder type.

(C) Divers who do not even wish to consult the small linear table 60, can use a table so simple that it can be committed to memory. This small mnemonic table is set out here below and gives rise to errors shown in the table of FIG. 11.

mnemonic Table

| Depth m. | GN |
|---|---|
| 0–27 | 12 |
| 27–37 | 9 |
| 37–57 | 5 |

Figure 11:
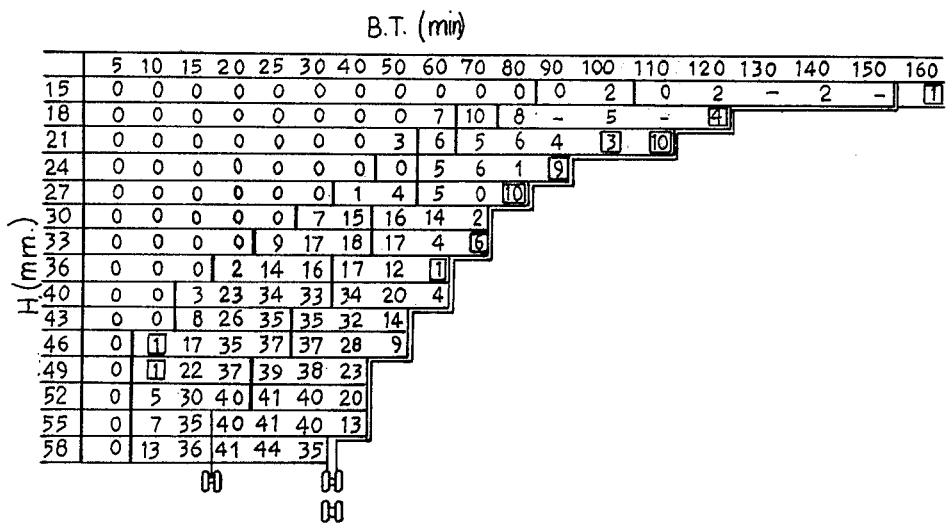

From the table of errors of FIG. 11 it can be seen how the errors are for the most part only errors of excess, and therefore not dangerous for dives which are not very long. In fact, the shortfall errors (framed numbers) are only close to the limits of the capacity of breathing apparatus of the single cylinder type.

DESCRIPTION OF THE SECOND PRACTICAL EMBODIMENT

A second practical embodiment (a decompression meter with a circular scale) will now be described with reference to FIGS. 12 to 14.

It will of course be appreciated that for the meter now to be described the relationship between the return times of the index and the arcuate length of the scale can be different from that of the linear decompression meter previously described. The guide numbers can also be different as long as they are based on a table compiled in its turn on the basis of a table of errors derived by comparing the return times of the index of the meter with the U.S. Navy tables.

Figure 14:
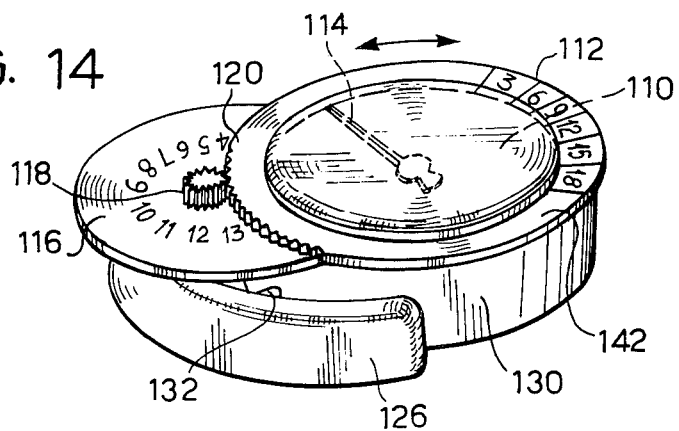
FIG. 14 is a perspective view of the FIG. 12 meter with its outer body removed.
Figure 12:
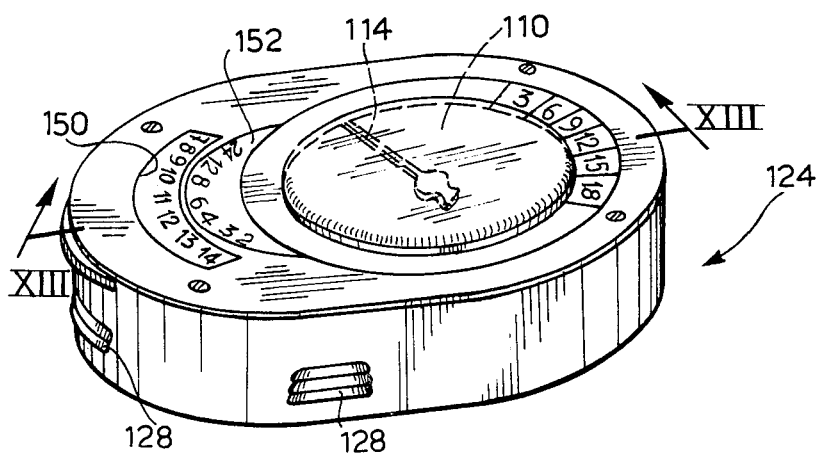
FIG. 12 is a perspective view of a second practical form of decompression meter embodying the invention, this meter being provided with a circular scale.
Figure 13:
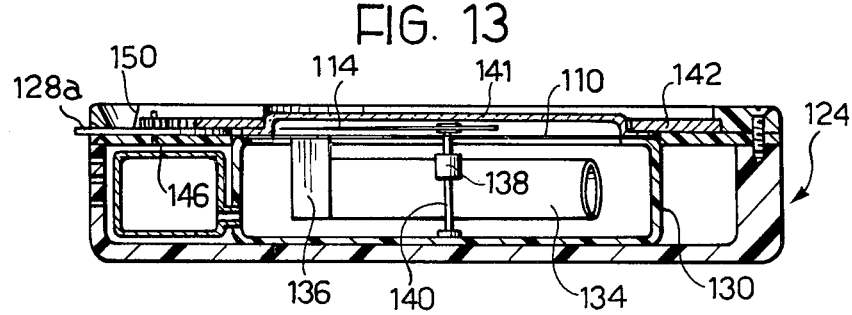
FIG. 13 is a longitudinal section, to an enlarged scale, taken on the plane indicated by the line XIII—XIII of FIG. 12.

In FIGS. 12 to 14 the parts of the meter corresponding to those of FIGS. 7 to 9 have been indicated with the same reference numerals increased by 100.

The decompression meter of FIGS. 12 to 14 comprises a housing constituted by a multiple part box 124, which can be of a rigid plastics material.

A deformable envelope 126 is disposed within the housing 124. The interior of the housing communicates with the external environment through apertures 128 whereby to subject the envelope 126 to the pressure of the external environment.

The housing 124 also contains a rigid, watertight, envelope 130, which is constituted by the casing of a depth meter of the Bourdon tube type.

The two envelopes 126 and 130 are filled with a gas (normally air) and communicate with one another via a throttled passage 132.

The pressure transducer of the decompression meter is constituted by the Bourdon tube 134 of the said depth meter. Within the casing 130 there is located a fixed face plate 110, in the form of a disc, which corresponds to the fixed strip 10 of FIGS. 6 and 8. One end of the Bourdon tube 134 is fixed to the inner, or lower face of the disc 110 by means of a small block 136. The other end of the tube, (not shown) is provided with a movement amplifying mechanism, of a standard type, which transmits deformation movements of the tube 134 to a toothed sprocket 138 keyed on to a small shaft 140. The upper end of the shaft 140 extends through a central aperture provided in the disc 110 and is keyed to a needle 114 which constitutes a movable index having the same function as the index 14 of the previously described embodiment.

The index 114 is visible through a circular transparent window or "glass" 141 (normally made of a transparent plastics material).

A circular annulus 142 is rotatably mounted around the transparent window 141. An arcuate portion 112 of the annulus 142 is marked with the second scale section; this annulus portion 112 constitutes the movable element which in the previous embodiment was formed by the plate 12. The remaining portion of the annulus 142 has the same function as the toothed member 42 of the previous embodiment.

A portion 120 of the peripheral edge of the disc 142 is toothed and meshes with a toothed sprocket 118 rigidly connected to an auxiliary disc or quadrant 116. The sprocket 118 and disc 116 are rotatably mounted within the housing 124 by means of a small shaft 146. A peripheral part of the disc 116 projects through a slot 128a, in the housing 124 to enable the disc 116 to be manually rotated by a diver.

The disc 116 is marked with guide numbers or symbols GN which are visible through an arcuate window 150 formed in the same face of the housing 124 as that displaying the disc 110 and the movable annulus portion 112.

Associated with the arcuate window 150 is a small fixed plate 152 on which there are marked the S.I. intervals discussed above.

It will be appreciated that the operation of the decompression meter shown in FIGS. 12 to 14 is entirely analagous to that of the decompression meter shown in FIGS. 7 to 9, except for the fact that the movement of the index 114 and also of the element 112 is angular rather than linear. The return movement of the index 114 in FIGS. 9 to 11 is in the anti-clockwise sense, according to the usual practice in instruments of this type.

I claim:

1. In a decompression meter adapted to be carried by a diver during an underwater dive comprising:
   a housing formed with at least one aperture communicating the interior of the housing with the external water environment;
   a deformable envelope defining a variable volume chamber, a rigid envelope defining a fixed volume chamber, and means defining a restricted passage intercommunicating said chambers, both said chambers being disposed within the housing and containing gas, and the deformable envelope being subjected to the pressure of the external environment;
   a pressure transducer disposed in said fixed volume chamber and arranged to sense the pressure of gas therein;
   a scale comprising a first section corresponding to conditions in which decompression halts during the ascent of a diver towards the water surface are unnecessary, and a second section corresponding to conditions in which decompression halts are necessary during the ascent; and
   an index operatively associated with the transducer and movable along the scale in opposite directions in dependence on the pressure sensed by the transducer, the improvement wherein the second section of the scale is carried by a movable element so mounted by the housing as to be displaceable relative to the first scale section, said meter further comprising indicator means for indicating the position of the movable element relative to said first scale section, and a manual operating member associated with said movable element and operable by the diver to cause displacement of said element along said first scale section to a position selected at least on the basis of the maximum depth reached and, optionally, on the basis of the dwell time at at this maximum depth and on the basis of the elapsed time between the previous dive and the current dive whereby the necessity and number of decompression halts during ascent from a dive can be determined by the position of said index relative to said second section of the scale.

2. A decompression meter according to claim 1, wherein the said indicator means comprises an indicator plate interconnected with said movable element by a mechanical transmission which provides a reduction gearing effect therebetween, an auxiliary scale carried by said indicator plate and provided with a series of guide symbols, and at least one fixed reference mark carried by the housing and cooperating with said guide symbols to indicate the position of said movable element along the first scale section; the selection of which said guide symbol of the auxiliary scale is aligned with said mark being made by the diver on the basis of the maximum depth reached by the diver and, optionally, also on the basis of the dwell time at this depth.

3. A decompression meter according to claim 2, wherein a plurality of said fixed reference marks are provided on said housing with each mark having an associated indication of a respective elapsed time between a previous dive and a current dive, the actual mark used by the diver when selecting the position of said movable element being chosen according to the relevant elapsed time value for the diver.

4. A decompression meter according to claim 2, wherein the rigid envelope is in the form of tubular casing having at least one transparent wall part visible from externally of said housing, said pressure transducer being constituted by an elongate element contractable and expandable along the longitudinal direction of the tubular casing, and said index being carried by a movable part of said elongate element such as to be visible through said transparent wall part, said first scale section extending linearly along the transparent wall part of the tubular casing and the said movable element being in the form of a plate movable linearly along the first scale section and connected to the said operating member.

5. A decompression meter according to claim 4, wherein the pressure transducer is a sealed capsule of elongate, substantially cylindrical, form which contains a gas and has a lateral bellows wall, one end of the capsule being fixed to one end of said tubular casing and the other end of the capsule being free to slide in the tubular casing and carrying the movable index.

6. A decompression meter according to claim 2, wherein the said indicator plate is a disc rotatably mounted by the housing, said mechanical transmission comprising a toothed sprocket rigidly connected to the disc and a toothed member slidably mounted in the housing for movement parallel to said first scale section, the toothed member carrying said movable element and being provided with a toothed portion in mesh with the toothed sprocket.

7. A decompression meter according to claim 6, wherein the toothed member is an elongate element of rigid material extending parallel to the first scale section, the said movable element being mounted laterally offset to the side of said elongate element nearest the first scale section and a portion of the corresponding edge of the said elongate element being formed as said toothed portion.

8. A decompression meter according to claim 7, wherein the end portion of the toothed member remote from said sprocket is slidably mounted, with lateral play, in a bracket rigidly connected to the housing, said housing mounting in an angularly adjustable manner an eccentric situated intermediate the sprocket and the bracket, said eccentric being in engagement with the edge of the toothed member opposite the edge provided with said toothed portion whereby to maintain the latter in mesh with the sprocket without play.

9. A decompression meter according to claim 2, wherein the pressure transducer comprises manometric apparatus of the Bourdon type contained in a casing constituting the said rigid envelope and including a pointer which constitutes the said index and is movable across a circular face plate of said apparatus, said first scale section being constituted by said face plate and the said movable element being constituted by a portion of a circular annulus which is rotatably mounted coaxially with respect to the said circular face plate.

10. A decompression meter according to claim 9, wherein the said annulus is situated outside the casing and has a peripheral toothed portion, the said indicator plate being in the form of a disc rotatably mounted in the said housing about an axis parallel to the axis of the said annulus, and the mechanical transmission comprising the said peripheral toothed portion of the annulus and a toothed sprocket rigidly connected to the indicator-plate disc and meshing with the said toothed portion.

11. A decompression meter according to any one of claims 2 to 10, wherein the said operating member is constituted by the said indicator plate, a peripheral portion of which is accessible from outside the housing.

12. A decompression meter according to any one of claims 6,7,8 and 10, wherein the indicator-plate disc is disposed behind an external wall of the housing, said external wall being formed with an arcuate window in which appear the guide symbols of the said auxiliary scale carried by the indicator-plate disc, the said at least one fixed reference mark being situated along an arcuate edge of the window.

13. A decompression meter according to claim 1, wherein said manual operating member is constituted by a portion of said movable element.

14. A decompression meter according to claim 1 or claim 13, wherein said indicator means is constituted by a portion of said movable element provided with a series of guide symbols arranged to cooperate with the fixed reference mark provided on said housing.

* * * * *